United States Patent
Kira et al.

(10) Patent No.: US 6,895,124 B1
(45) Date of Patent: May 17, 2005

(54) IMAGE PROCESSING APPARATUS

(75) Inventors: Kenji Kira, Tokyo (JP); Lee Chien Hui, Tokyo (JP); Teruyoshi Numata, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 920 days.

(21) Appl. No.: 09/692,045

(22) Filed: Oct. 20, 2000

(30) Foreign Application Priority Data

Oct. 20, 1999 (JP) .......... P. 11-298631

(51) Int. Cl.$^7$ .............. G06K 9/40
(52) U.S. Cl. .......... 382/260; 382/261; 382/263; 382/264; 382/275
(58) Field of Search .......... 382/258, 260, 382/261, 262, 263, 264, 274, 275

(56) References Cited

U.S. PATENT DOCUMENTS

| | | | | |
|---|---|---|---|---|
| 5,771,318 A | * | 6/1998 | Fang et al. | 382/261 |
| 6,480,300 B1 | * | 11/2002 | Aoyama | 358/1.9 |
| 6,614,944 B1 | * | 9/2003 | Levantovsky | 382/261 |
| 6,665,448 B1 | * | 12/2003 | Maurer | 382/261 |
| 6,731,821 B1 | * | 5/2004 | Maurer et al. | 382/263 |

FOREIGN PATENT DOCUMENTS

| | | | | |
|---|---|---|---|---|
| JP | 2000-102020 | 4/2000 | ......... | H04N/7/32 |
| JP | 2000-105815 | 4/2000 | ......... | G06T/1/00 |

OTHER PUBLICATIONS

Patent Abstracts of Japan 2000–102020 Apr. 7, 2000.
Patent Abstracts of Japan 2000–105815 Apr. 11, 2000.
Kondo, H., et al, "Colored Face Image Processing by Vector ε–Filter–Removal of Wrinkles–", Mar. 1998, General Conference of IEICE D–11–143, p. 143.
Harashima, H., et al, "ε–Separating Nonlinear Digital Filter and Its Applications", The Institute of Electronics, Information and Communication Engineers, 1982, 4,J65–A, No. 4, pp. 297–304.

\* cited by examiner

*Primary Examiner*—Thomas D. Lee
(74) *Attorney, Agent, or Firm*—Sughrue Mion, PLLC

(57) ABSTRACT

In this invention, for example, in order to realize conversion to "smooth skin" and "wrinkle enhancement" with a natural look while preserving the grain and texture of the skin, a specific amplitude band variation component separation type digital filter (β-filter), which comprises a specific amplitude band variation component calculation section 4, is newly provided. Further, the calculation section 4 selectively separates only a specific amplitude band variation component U (m, n) from an input image signal X (m, n) applied to the filter. An image signal y (m, n), which is provided by subtracting the component from the input image signal (conversion to "smooth skin") or by adding the component to the input image signal ("wrinkle enhancement"), is outputted in response to an external correction instruction.

5 Claims, 10 Drawing Sheets

FIG. 1

WAVEFORM OF ORIGINAL SIGNAL → ε-FILTER OUTPUT WAVEFORM

IMAGE PROCESSING APPARATUS

BACKGROUND OF THE INVENTION

1. Field of the Invention

This invention relates to image processing, particularly to an image processing apparatus which can be used as an "electronic makeup" apparatus providing high quality and natural looking images in a field where sophisticated works are required in both the contents and representation, such as television dramas and movies.

2. Description of the Related Art

It is known that by applying a two-dimensional ε-filter (for example, refer to Harajima and others "ε-Separating Nonlinear Digital Filter and Its Applications" IEICE (The Institute of Electronics, Information and Communication Engineers) 1982, 4,J65-A, No.4, pp297–304) to an image of a human face, neck, hand, etc., a "smooth skin" image with wrinkles and spots removed or decreased can be obtained (refer to Arakawa and others "Color Face Image Processing by Vector ε-Filter~Removal of Wrinkles~" March 1998, 1998 General Conference of IEICE D-11-143, PP143-). This will be hereinafter referred to as conversion to "smooth skin." This is based on the fact that small-amplitude light and dark change is smoothed by "separating and suppressing small-amplitude high-frequency noise components in an image", which is a function of the two-dimensional ε-filter.

The ε-filter was originally designed for the purpose of separating and removing the small-amplitude high-frequency noise components superimposed on a signal waveform.

Figure 1:
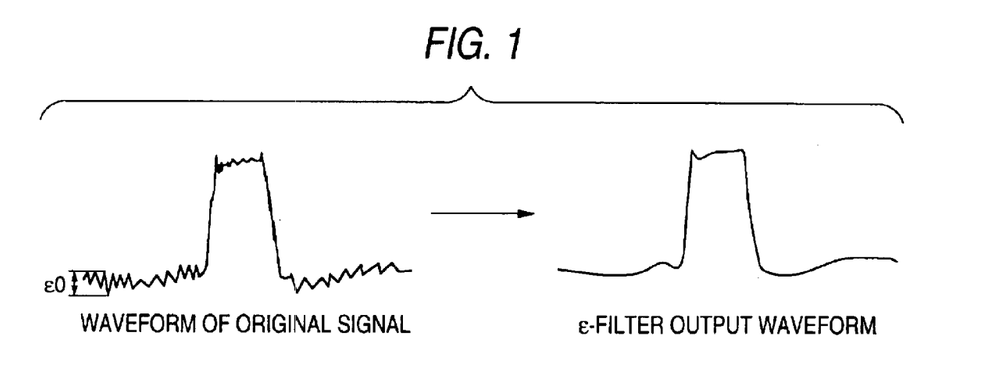
FIG. 1 shows the characteristic of a $\epsilon$-filter based on the relationship between the input signal and the output signal.

A low-pass filter (LPF) that is usually used for noise removal not only suppresses noise components, but also degrades edges of signals. Thus if it is applied to an image, the low-pass filter has the disadvantage of blurring the whole image. However, as shown in the relationship between the input and output signals of the ε-filter in FIG. 1, the ε-filter has a characteristic of flattening only small-amplitude level changes in a signal waveform, and has a feature of scarcely impairing sharpness of the whole image because the edges which have steep level changes are preserved.

Letting an input signal sequence be x (m, n), the output signal y (m, n) of the two-dimensional ε-filter is represented by the following expression (1):

$$y(m, n) = x(m, n) - \sum_i \sum_j a_{i,j} \cdot F(x(m, n) - x(m + i, n + j)) \quad (1)$$

where $a_{i,j}$ is a weight coefficient. If the filter size is (2M+1) X (2N+1), it will satisfy the following expression:

$$\sum_{i=-M}^{M} \sum_{j=-N}^{N} a_{i,j} = 1 \quad (2)$$

Figure 2:
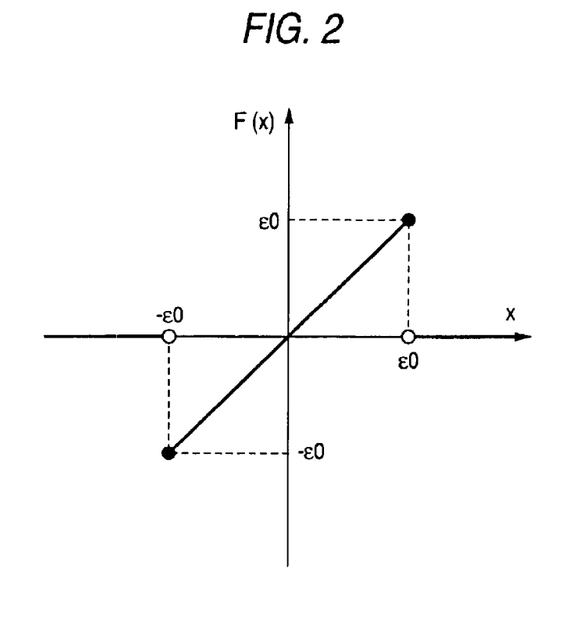
FIG. 2 is a graph of the nonlinear function F(x) used in the $\epsilon$-filter.

The function F(x) represented in expression (1) in a nonlinear function shown in a graph of FIG. 2 and F(x)=0 when $|x| > \epsilon_o$.

Throughout the specification, the value of $\epsilon_o$ will be referred to as ε value.

Figure 3:
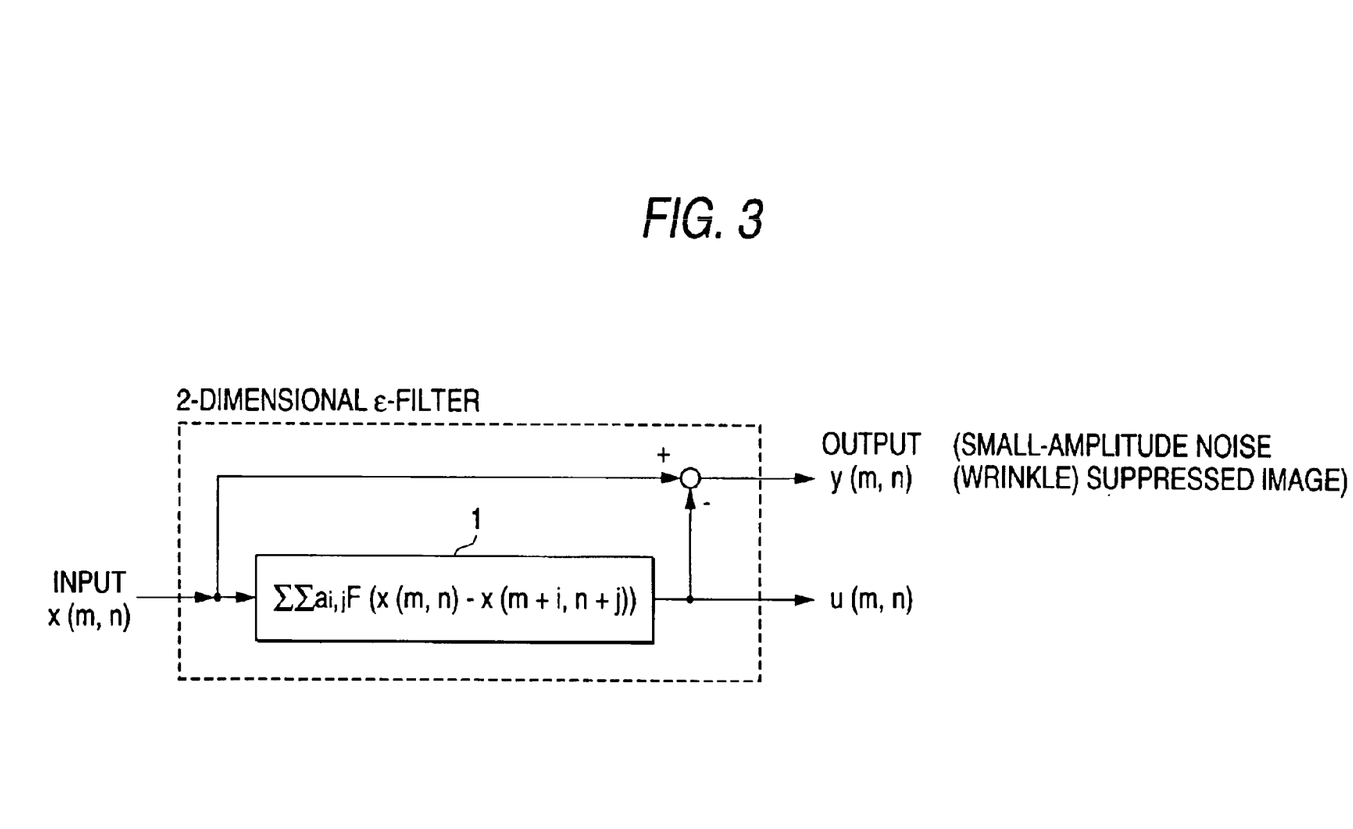
FIG. 3 shows the basic configuration of a two-dimensional $\epsilon$-filter.

FIG. 3 shows a basic configuration of the two-dimensional ε-filter.

In FIG. 3, the solid line frame denoted by numeral 1 indicates a calculation section of a small-amplitude high-frequency noise component u (m, n) (the second term on the right side in expression (1)). Output from the calculation section is subtracted from the input signal sequence x (m, n), whereby the output signal sequence y (m, n) with the small-amplitude noise component suppressed is provided.

By applying ε-filter to an image of a human face, the face image can be converted into a beautiful face having "smooth skin" with wrinkles and spots removed or decreased. The wrinkles and spots are not so-called noise, but involve comparatively small-amplitude light and dark changes in an image. The wrinkles and spots can be made inconspicuous, by smoothing these small-amplitude light and dark changes with the small-amplitude level change suppressing function of the ε-filter.

Here, only the small-amplitude level changes such as the wrinkles and spots are flattened and steep level changes such as boundaries of pupils, eyelids, eyebrows, etc., are kept, so that sharpness of the whole image is scarcely impaired and conversion to "smooth skin" can be accomplished.

Conversion to "smooth skin" is intended for skin areas strictly. However, if the whole image is processed uniformly through the ε filter, small-amplitude level changes of peripheral images are also suppressed and as a result, delicate light and dark patterns of hairs, clothes, backgrounds, etc., are also flattened, resulting in an image where original details and texture are impaired.

This is fatal in applications wherein high quality is demanded for the whole image such as television, movies, etc. However, the ε filter is made to selectively act only on the skin color area of an image, whereby conversion to "smooth skin" can be accomplished without impairing any details or texture of peripheral images. To do this, a technique called "chromakey" (technique of electronically discriminating a specific color area in an image from others and applying image processing such as filtering on y to the area restrictedly), a well-used device in the television technical field, may be adopted.

As described above, conversion to "smooth skin" through the ε filter has the potential for use as "electronic makeup" in television drama and movie production, etc. However, to make the most of the ε filter in the field where there are various demands for image processing and requirements for high quality of the whole image, the following problems to be resolved exist:

Conversion to "smooth skin" makes a skin image seem to be smooth, and thus also produces the "rejuvenation" effect as video representation. For an elderly actress to act as a girl such as in a drama of a biography, etc., although there are existing points to be improved (which will be pointed out later), conversion to "smooth skin" is a promising technique to be used as an electronic makeup technique where "rejuvenating skin" is obtained by performing image processing.

As described above, conversion to "smooth skin" can be realized using the ε filter. On the other hand, for playing an aged person drastically exceeding the actual age such as in a television drama or a movie, an electronic makeup technique for producing an "old" effect such as "wrinkle enhancement" is also demanded. However, hitherto, it has been impossible to realize "wrinkle enhancement" which can also be said to be the opposite effect to conversion to "smooth skin."

In conversion to "smooth skin" using the ε filter, the degree (strength) of conversion to "smooth skin" can be easily adjusted simply by changing one parameter ($\epsilon_o$ in FIG. 2) in response to the strength of the wrinkles and spots to be hidden. Although the whole skin becomes smooth as the degree of conversion to "smooth skin" is increased, the grain and texture of the skin are lost and "plastic" texture rather than "human skin" results, leading to an image poor in reality. To avoid this, if conversion to "smooth skin" is weakened, the natural look is recovered, but the wrinkles and spots to be hidden appear; this is a dilemma.

In other words, a solution to "provide an image where the grain and texture of the skin are preserved while hiding annoying wrinkles and spots" becomes necessary.

Further, assuming that the above-described "wrinkle enhancement" can be realized, it is desired to provide a "wrinkles enhanced" image with the grain of the skin kept in the original state rather than simple "wrinkle enhancement," needless to say.

SUMMARY OF THE INVENTION

It is therefore an object of the invention to realize "wrinkle enhancement" that was previously impossible, and to provide an image processing apparatus for performing conversion to "smooth skin" without impairing the grain or texture of skin, and "wrinkle enhancement" with the grain of the skin preserved in its original state.

Finally, according to the invention, an image processing apparatus is provided for performing conversion to "smooth skin" or "wrinkle enhancement" for an input image. This apparatus is characterized by input image signals which are applied to an input terminal of a $\epsilon$-filter, and an extended $\epsilon$-filter adapted to extract selectively or simultaneously, "wrinkle enhanced" signals obtained by adding the output signal of a small amplitude variation component calculation section of the $\epsilon$-filter to the input image signal, and "smooth skin" converted signals of the input image signals (which is the output of the previously mentioned $\epsilon$-filter).

According to this invention, an image processing apparatus is provided, which is characterized by having the ability to extract an input image signal as a "smooth skin" converted signal while preserving the grain and texture of the skin. This is achieved by applying an input image signal to input terminals of two $\epsilon$-filters having large and small $\epsilon$ values, and adding the output signal of the small-amplitude variation component calculation section of the smaller $\epsilon$ valued $\epsilon$-filter to the output signal of the $\epsilon$-filter having the larger $\epsilon$ value.

According to this invention, an image processing apparatus is provided, which is characterized by having the ability to get an image signal as a "smooth skin" converted signal or a "wrinkle enhanced" signal correspondingly, while preserving the grain and texture of the skin. This is achieved by applying an input image signal to the input terminal of a large $\epsilon$ valued extended $\epsilon$-filter and the input terminal of a small $\epsilon$ valued $\epsilon$-filter. When the correction instruction is "smooth skin" conversion, a "smooth skin" converted signal preserving the grain and texture of the skin is obtained by adding the output signal of the small-amplitude variation component calculation section of the $\epsilon$-filter to the "smooth skin" converted output signal of the extended $\epsilon$-filter.

When the correction instruction is "wrinkle enhancement", a "wrinkle enhanced" signal preserving the grain and texture of the skin by subtracting the output signal of the small-amplitude variation component calculation section of the $\epsilon$-filter from the "wrinkle enhancement" output signal of the extended $\epsilon$-filter.

According to the invention, an image processing apparatus is provided, which is characterized by having the ability to selectively or simultaneously provide a "smooth skin" converted signal preserving the grain and texture of the skin, a "wrinkle enhanced" signal keeping the grain and texture of a skin in its original state. This is achieved by a new type digital filter (named "$\beta$-filter") which separates specific variation components within a specified amplitude band When given any two large and small amplitude values that can be set arbitrarily, the $\beta$-filter selectively separates only the variation components which have an amplitude value between the two given amplitude values.

DETAILED DESCRIPTION OF THE PRESENT INVENTION

Referring now to the attached drawings, the preferred embodiments of the invention are shown.

The invention will be discussed in the following order:
(1) Realization of "wrinkle enhancement"
(2) Realization of conversion to "smooth skin" and "wrinkle enhancement" while preserving the grain and texture of the skin.

The filter according to the invention, which is capable of providing both functions of "smooth skin" and "wrinkle enhancement" conversion, will be hereinafter referred to as extended ε-filter.

Item (2) above is realized by the following three methods a to c:
a. Two ε-filters represented by expression (1) are used in combination to execute conversion to "smooth skin" with a natural look.
b. An ε-filter and an extended ε-filter are used in combination in order to execute switch-able conversion to "smooth skin" and "wrinkle enhancement" with a natural look.
c. A new digital filter provided by the invention is used to execute conversion to "smooth skin" and "wrinkle enhancement" with a natural look.

First, realization of "wrinkle enhancement" in (1) will be discussed.

It is difficult to make a new wrinkle at a point where no wrinkle exists. In this invention, the output of the small-amplitude variation component calculation section, which is a component of the ε-filter, is used to enhance an original wrinkle.

To execute conventional conversion to "smooth skin", the small-amplitude variation component calculation section, indicated by numeral 1 in the ε-filter, finds the small-amplitude variation component of an input signal sequence and the component is subtracted from the input signal sequence (see FIG. 3).

Conversely, as shown in expression (3), the small-amplitude variation component (second term on the right side of expression (3)) is added to the input signal sequence (first term on the right side), whereby the small-amplitude variation component of a wrinkle, etc., can be enhanced ("wrinkle enhancement"). However, the addition (same phase addition) result might exceed the stipulated level range of a digital image (for example, 0 to 255 in 8 bits range), thus clip processing after addition (processing of limiting the result to 0 if the result is 0 or less and limiting the result to 255 if the result is 255 or more) is required.

$$y(m, n) = x(m, n) - \sum_i \sum_j a_{i,j} \cdot F(x(m, n) - x(m + i, n + j)) \quad (3)$$

It is convenient and cost efficient to integrate the apparatus for realizing "wrinkle enhancement" with the existing apparatus for realizing conversion to "smooth skin", and enable both conversion to "smooth skin" and "wrinkle enhancement."

As the integral circuit configuration, the following two configurations are possible:
(a) Configuration wherein either "smooth skin" or "wrinkle enhancement" conversion signal is output (which will be hereinafter referred to as "one-output type"), and the small-amplitude variation components are added/subtracted to/from the input image in response in to an external conversion instruction (="smooth skin"/"wrinkle enhancement") and
(b) configuration wherein the processed results of conversion to "smooth skin" and "wrinkle enhancement" are output simultaneously, which will be hereinafter referred to as "simultaneous output type," and either can be selected for use as required.
(both configurations will be referred to as extended ε-filters throughout the specification.)

Figure 4:
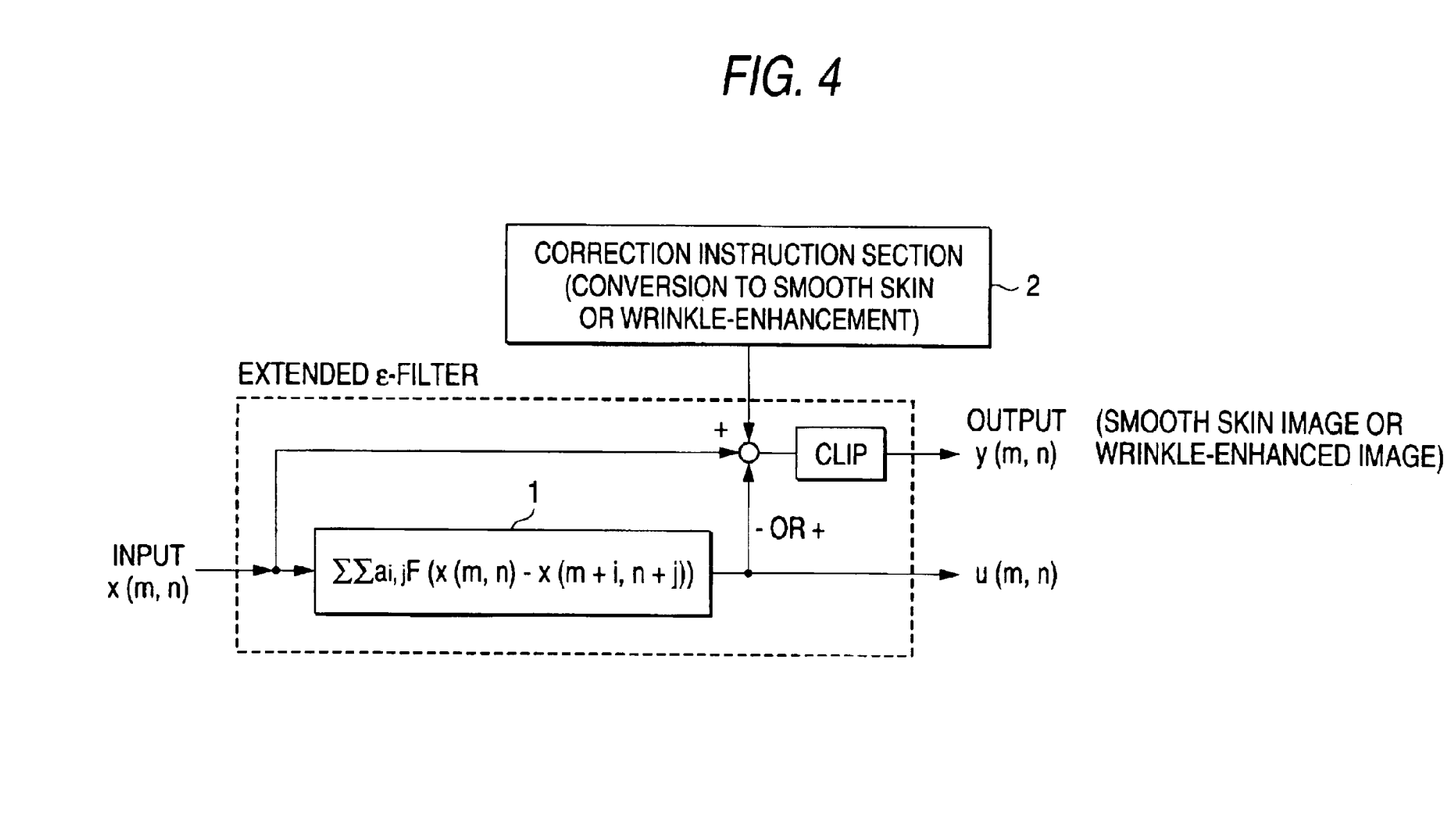
FIG. 4 shows a configuration example of the invented image processing apparatus executing conversion to "smooth skin" and "wrinkle enhancement" in "one-output type".
Figure 5:
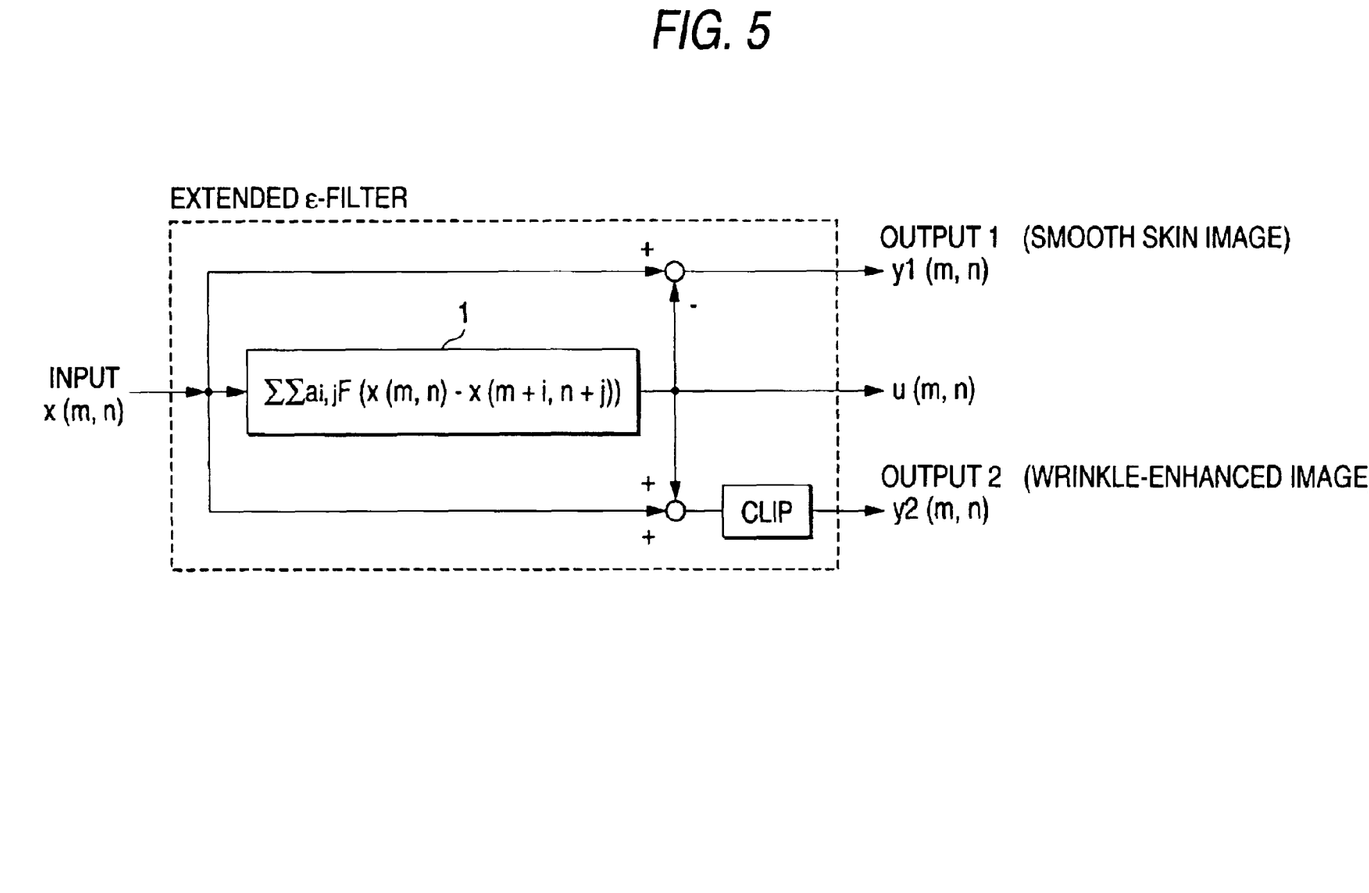
FIG. 5 shows a configuration example of the invented image processing apparatus executing conversion to "smooth skin" and "wrinkle enhancement" in "continuously parallel output type".

FIGS. 4 and 5 show configuration examples of the invented image processing apparatus for executing conversion to "smooth skin" and "wrinkle enhancement" in the forms corresponding to (a) and (b) above. In FIGS. 4 and 5, the portion of the solid line frame indicated by numeral 1 is a calculation section of a small-amplitude variation component U (m, n). A conversion instruction section indicated by numeral 2 in FIG. 4 is a section for instructing the image processing apparatus to perform either conversion to "smooth skin" or "wrinkle enhancement." Each apparatus comprises a clip circuit (Clip) for suppressing the addition (same phase addition) result of the small-amplitude variation component for "wrinkle enhancement" to the stipulated level range of a digital image (for example, 0 to 255).

Next, the method of realizing conversion to "smooth skin" while preserving the grain and texture of the skin by using two ε-filters represented by expression (1) in combination (the method in (2) a. described above) will be discussed.

First, the principle will be discussed.

A wrinkle, a spot, and grain of the skin are all comparatively small-amplitude level changes (amplitude variation). However, if a wrinkle and a spot at an annoying level are compared with the grain of the skin, generally the amplitude variation of the grain of the skin is comparably minute. So-called image pickup noise is a possible variation element close to the amplitude variation of the grain of the skin, but the image pickup noise may be ignored in high-quality image pick-up conditions of television and movies.

In other words, there is the following relationship among them:

Amplitude variation of wrinkles or spots >amplitude variation of grains and textures of skin >>image pickup noise.

Incidentally, if a small amplitude value εh adequate for removing wrinkles and spots (conversion to "smooth skin") is processed as the ε value (see FIG. 2) through the ε-filter represented by expression (1), the level change concerning the grain of the skin will, of course, also be suppressed.

On the other hand, according to the operation principle of the ε-filter, the minute-amplitude variation component u (m, n), provided by setting a minute amplitude value εL (εL<εh) as the ε value (which matches the amplitude variation for the grain of the skin), and processing it through the ε-filter, is a level change related to the grain and texture of the skin. Therefore, in the invention, it is used to revive the grain and texture of the skin which was lost in previous technique.

In other words, in order to "preserve the grain of the skin with smaller variation width while removing annoying wrinkles and spots (conversion to "smooth skin")," 
(a) the original image is converted to "smooth skin" using a small amplitude value εh through ε-filter I (here, the grain component is also suppressed);
(b) the level variation component with minute amplitude (grain component) is separated from the original image using the minute amplitude value εL through ε-filter II; and
(c) the level variation component with minute amplitude separated in (b) is added to the processing result of the "smooth skin" conversion in (a).

Figure 6:
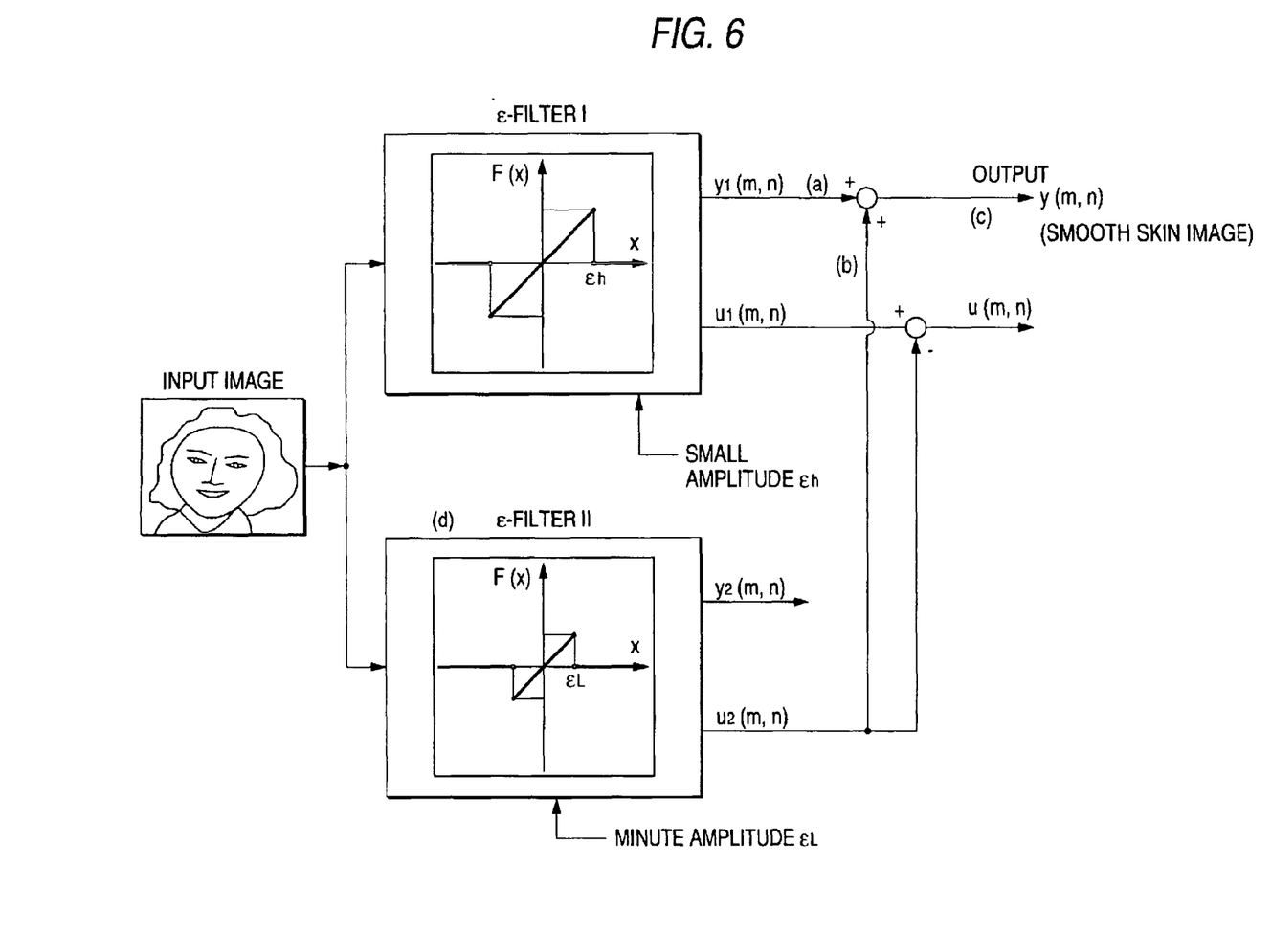
FIG. 6 shows a configuration example of the invented image processing apparatus intended for "removing annoying wrinkles and spots with the grain and texture of the skin, the smaller variation, preserved".

FIG. 6 shows a configuration example of the invented image processing apparatus for performing the signal processing described above.

Next, the method in (2) b. described above will be discussed, namely, the method of using extended ε-filter I and ε-filter II in combination in order to realize switch-able conversion to "smooth skin" and "wrinkle enhancement" with a natural look.

Also in this method, in order to execute conversion to "smooth skin," the minute-amplitude variation component u (m, n), provided through the ε-filter II, is added to output of the extended ε-filter I as explained in the method (2) a. described above. Thus the grain and texture of the skin which had been lost in previous technique is revived.

In contrast, in order to execute "wrinkle enhancement," enhancement of the grain based on the minute-amplitude variation component u (m, n), which is essentially undesirable, is canceled for restoring the original grain level.

In other words, in order to "enhance significant wrinkles and spots while preserving the grain of the skin in its original state,"
(a) wrinkles of an original image are enhanced according to small amplitude value εh, by using extended ε-filter I (here, the grain component is also enhanced);
(b) level variation component with minute amplitude (grain component) is separated from the original image, using the minute amplitude value εL through the ε-filter II; and
(c) the level variation component with minute amplitude separated in (b) is subtracted from the processing result of "wrinkle enhancement" in (a).

Figure 7:
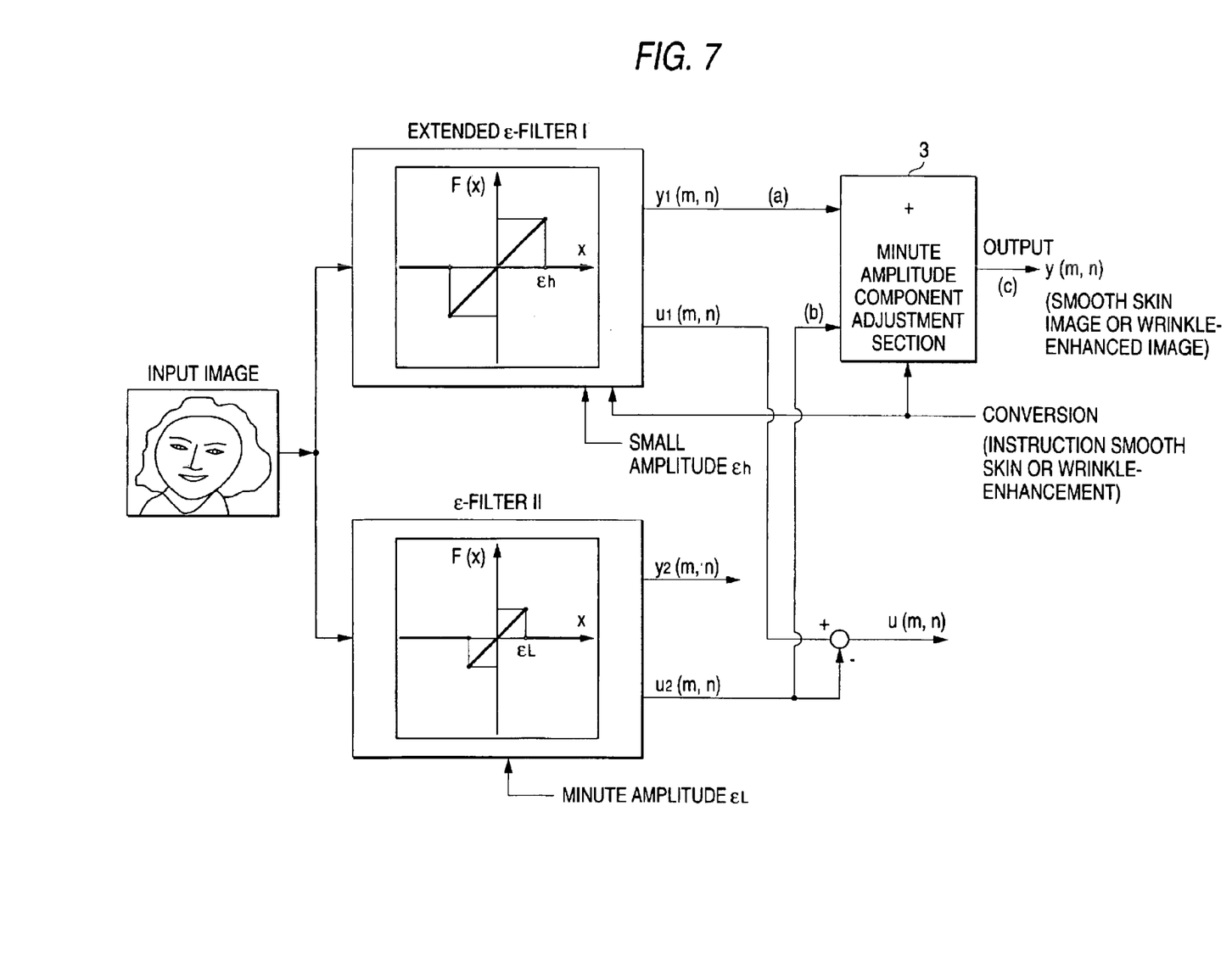
FIG. 7 shows a configuration example of the invented image processing apparatus for selectively performing processing of "removing annoying wrinkles and spots with the grain and texture of the skin, the smaller variation, preserved" and "enhancing significant wrinkles and spots while preserving the grain and texture of the skin in its original state".

FIG. 7 shows a configuration example of the invented image processing apparatus, for selectively performing processing between "preserving the grain of the skin, which has smaller variation width, while removing annoying wrinkles and spots" and "enhancing significant wrinkles and spots while preserving the grain of the skin in its original state."

In FIG. 7, a minute amplitude component adjustment section, indicated by numeral 3, is a section for performing adjustment processing of a minute amplitude variation component. This section is for executing the algorithm of the minute amplitude variation component u2 (m, n), which is separated through the ε-filter II for output y1 (m, n) of the extended ε-filter I, in response to the correction instruction for conversion to "smooth skin" or "wrinkle enhancement" (addition if the instruction is conversion to "smooth skin" or subtraction if the instruction is "wrinkle enhancement").

In this case, the extended ε-filter I is provided for performing conversion to "smooth skin" or "wrinkle enhancement" in accordance with the correction instruction; this topic was previously described with reference to FIG. 6.

Next, the method in (2) c. described above, will be discussed. This is the method to realize conversion to "smooth skin" and "wrinkle enhancement" with a natural look by using a new digital filter provided by the invention.

First, the method in (2) a. described above, will be reviewed. This is the method of using two ε-filters in combination, represented by expression (1), in order to perform conversion to "smooth skin" with a natural look. This method is executed according to the configuration previously described with reference to FIG. 6.

Signal processing performed according to the configuration in FIG. 6 is represented by expression (4). In expression (4), the first term on the right side (enclosed in braces) indicates the function of the ε-filter I (conversion to "smooth skin" based on ε=εh). The second term on the right side following the first term indicates the function of the ε-filter II (separation of the variation component "related to the grain of the skin" of amplitude ε or less).

$$y(m, n) = \left\{ x(m, n) - \sum_i \sum_j a_{i,j} \cdot F_{\varepsilon h}(x(m, n) - x(m + i, n + j)) \right\} + \quad (4)$$
$$\sum_i \sum_j a_{i,j} \cdot F_{\varepsilon L}(x(m, n) - x(m + i, n + j))$$

Now, if expression 4 is sorted out by focusing attention on:

$$\sum_i \sum_j a_{i,j}$$

the following expression (5) is obtained.

$$y(m, n) = x(m, n) - \sum_i \sum_j a_{i,j} \cdot \{F_{\varepsilon h}(x(m, n) - x(m + i, n + j)) - \quad (5)$$
$$F_{\varepsilon L}(x(m, n) - x(m + i, n + j))\}$$

The Fε (x) (see FIG. 2) returns the same value for x with $|x|<\varepsilon$, otherwise it returns 0. Thus, FεH (Δx) and FεL (Δx) becomes the following:
When $|\Delta x|<\varepsilon L$, Fεh (Δx)=Δx, FεL (Δx)=Δx
when $\varepsilon L<|\Delta x|\leq \varepsilon h$, Fεh (Δx)=Δx, FεL (Δx)=0
when $\varepsilon L<|\Delta x|$, Fεh (Δx)=0, FεL (Δx)=0
Therefore, the whole portion represented by {Fεh (Δx)−FεL (Δx)} in expression 5 has a characteristic of outputting the same value only for the variation component Δx contained in the amplitude band with $\varepsilon L<|\Delta x|<\varepsilon h$, and otherwise outputting 0.

Figure 8:
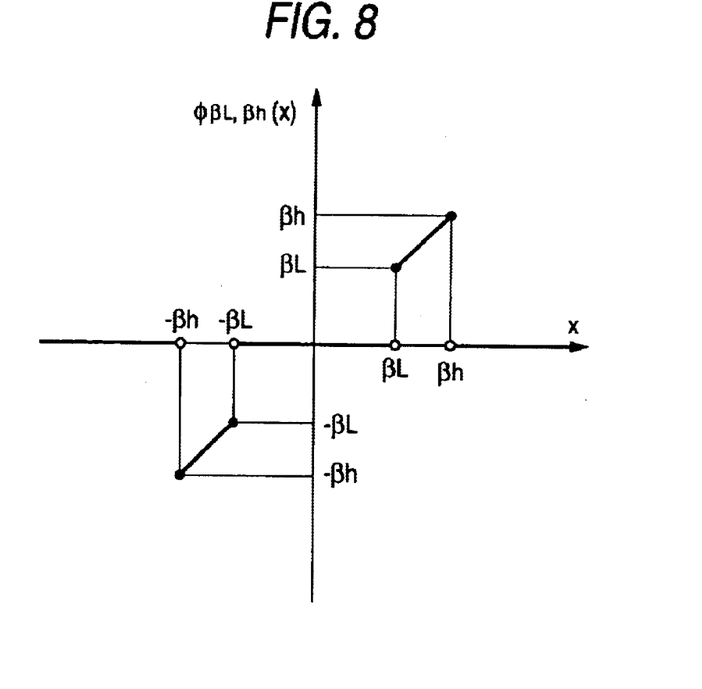
FIG. 8 is a graph to show the nonlinear function $\phi\beta L, \beta h$ (x) which defines the newly invented digital filter ($\beta$ filter).

This characteristic indicates a new nonlinear function defined by two parameters βL and βh as shown in FIG. 8 (φβL, βh (x)).

Using the new nonlinear function φβL, βh (x), expression (5) can be rewritten as the following expression (6):

$$y(m, n) = x(m, n) - \sum_i \sum_j a_{i,j} \cdot \phi_{\beta L, \beta h}(x(m, n) - x(m + i, n + j)) \quad (6)$$

In other words, expression (6) indicates the characteristic of a new nonlinear digital filter, which uses a new nonlinear function φβL, βh (x) to separate and suppress only the variation component of a specific amplitude band. This will be hereinafter referred to as "specific amplitude band variation component separation type digital filter" (or β-filter). As seen from the fact that expression (6) is derived from expression (4), the function is the same as the function provided by using two ε-filters in combination shown in FIG. 6. Therefore, one β-filter can accomplish conversion to "smooth skin" while preserving the texture of the skin in one process.

Figure 9:
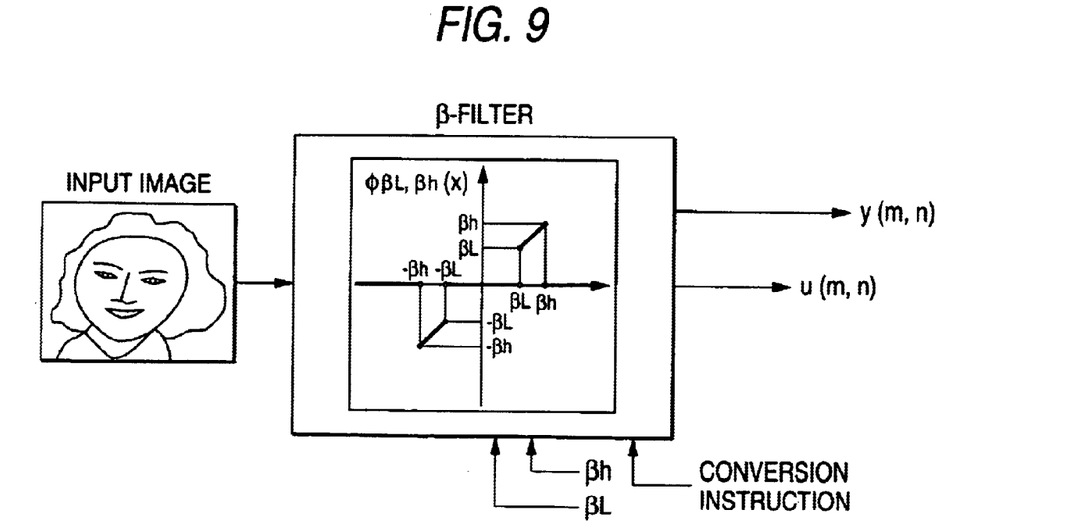
FIG. 9 shows that by using only one $\beta$-filter, high-quality conversion to "smooth skin" and "wrinkle enhancement" preserving the grain and texture of the original skin image can be achieved.

The β-filter can provide not only the suppression function of the separated specific amplitude band variation component (conversion to "smooth skin"), but also the enhancement function of the variation component ("wrinkle enhancement"). This is similar to how the expanded ε-filter is provided, by attaching the ε-filter output with the configuration of adding the small amplitude variation component separated through the ε-filter to an input image signal. Thus, as shown in FIG. 9, it is possible for one β-filter to cover high-quality conversion to "smooth skin" and "wrinkle enhancement", while considering the grain of the skin (in the previously described configuration FIG. 7, two filters of extended ε-filter I and ε-filter II are required). Therefore, an "electronic makeup apparatus" for producing natural processing results in a simple configuration can be provided.

In the basic configuration of the invented image processing apparatus using the specific amplitude band variation component separation type digital filter (or β-filter), the following two configurations are also possible:
(a) "One-output type," configuration wherein one correction output of conversion to "smooth skin," etc., is adopted.

The algorithm of a specific amplitude band variation component for an input signal (subtraction or addition) is changed in response to an external correction instruction (instruction for performing "smooth skin" or "wrinkle enhancement"); and (b) "Continuously parallel output type," configuration wherein the processing results of conversion to "smooth skin" and "wrinkle enhancement" are output continuously, and either can be selected for use as required.

This is similar to the configuration example of the extended ε-filter, provided by adding the function of enhancing a small-amplitude variation component to the configuration of the conventional ε-filter.

Figure 10:
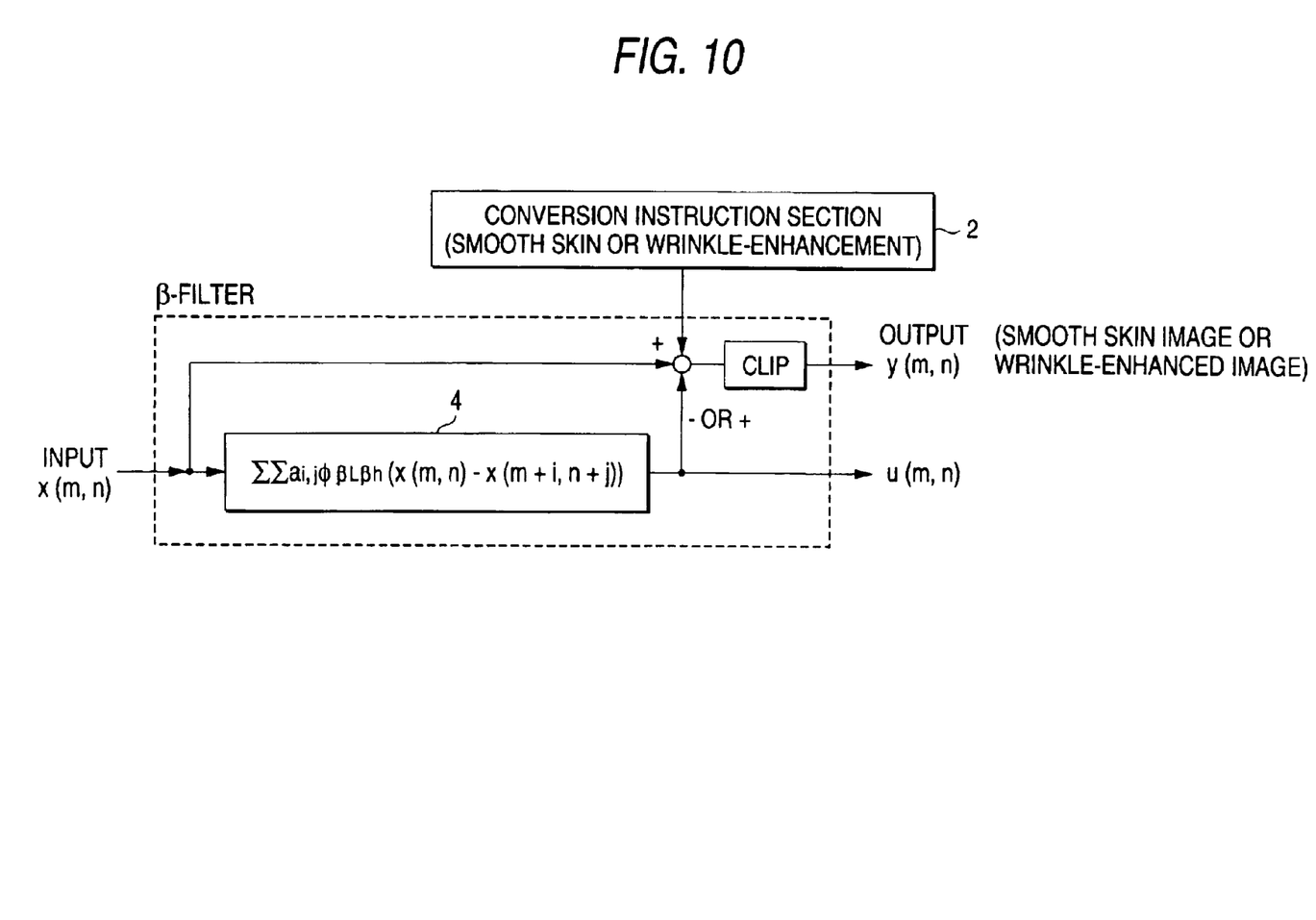
FIG. 10 shows a configuration example of the invented "one-output type" $\beta$-filter, image processing apparatus, for executing conversion to "smooth skin" and "wrinkle enhancement" preserving the grain and texture of the original skin image.
Figure 11:
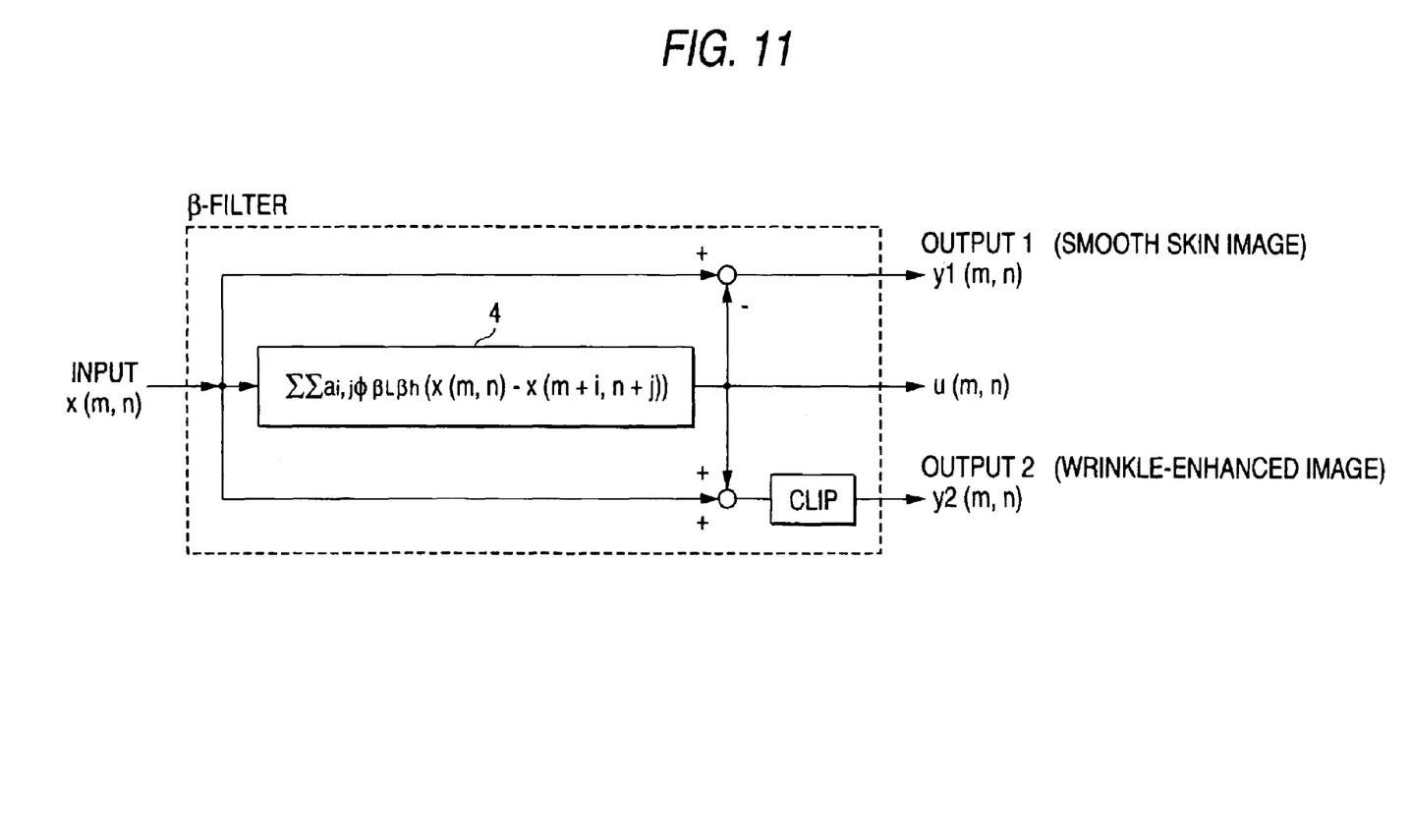
FIG. 11 shows a configuration example of the invented "simultaneously output type" $\beta$-filter, image processing apparatus, for executing conversion to "smooth skin" and "wrinkle enhancement" preserving the grain and texture of the original skin image.

FIGS. 10 and 11 show configuration examples of the invented image processing apparatus for executing conversion to "smooth skin" and "wrinkle enhancement" through the β-filter in the forms corresponding to (a) and (b) above. In FIGS. 10 and 11, the portion of the solid line frame indicated by numeral 4 is a specific amplitude band variation component calculation section. Each apparatus (FIGS. 10, 11) also comprises a clip circuit (Clip) for suppressing the addition (common-mode addition) result of the specific amplitude band variation component for "wrinkle enhancement" to the stipulated level range of a digital image (for example, 0 to 255).

The β-filter provided by the invention will be further discussed.

The function φβL, βh (x), which is fundamental part of the β-filter, is characterized by the fact that it is nonlinear function acting only on level variations having an amplitude value between the two amplitude values φβL and βh (x) (φβL≦|x|≦βh), and does not involve minute variation amplitude in the proximity of 0. Both functions of the conventional ε-filter, function φβL, βh(x) and nonlinear function F(x) shown in FIG. 2, define the filter requirement in the amplitude area of level variation; the essential functional difference between both functions φβL, βh(x) and F(x) can be compared to the difference between a band-pass filter and a low-pass filter in frequency.

In other words, the nonlinear function φβL, βh(x) is introduced, whereby producing digital filter capable of selectively separating and suppressing or enhancing only level variations contained in a specific amplitude band of an input signal sequence consisting of level variations of various amplitudes.

As previously described with reference to related previous documents, the ε-filter is a filter originally designed for the purpose of removing small-amplitude noise. For the purpose of removing noise, the function with the form as shown in FIG. 8 is not considered as the nonlinear function to be used. This is because in noise removal, it is not possible to remove noise in one amplitude band while saving minute amplitude changes.

Therefore, the digital filter, which is defined by these nonlinear and linear functions and provided by this invention, was produced from the purpose and idea entirely different from those of previous technique. This enables new applications in each field.

Finally, by combining the use of the P filter and a color area determination circuit, image processing for executing higher-quality conversion to "smooth skin" or "wrinkle enhancement" while considering the grain of the skin and preserving peripheral details and texture is made possible. The configuration demonstrates further effectiveness as an "electronic makeup" apparatus in fields of television and movies, etc.

Figure 12:
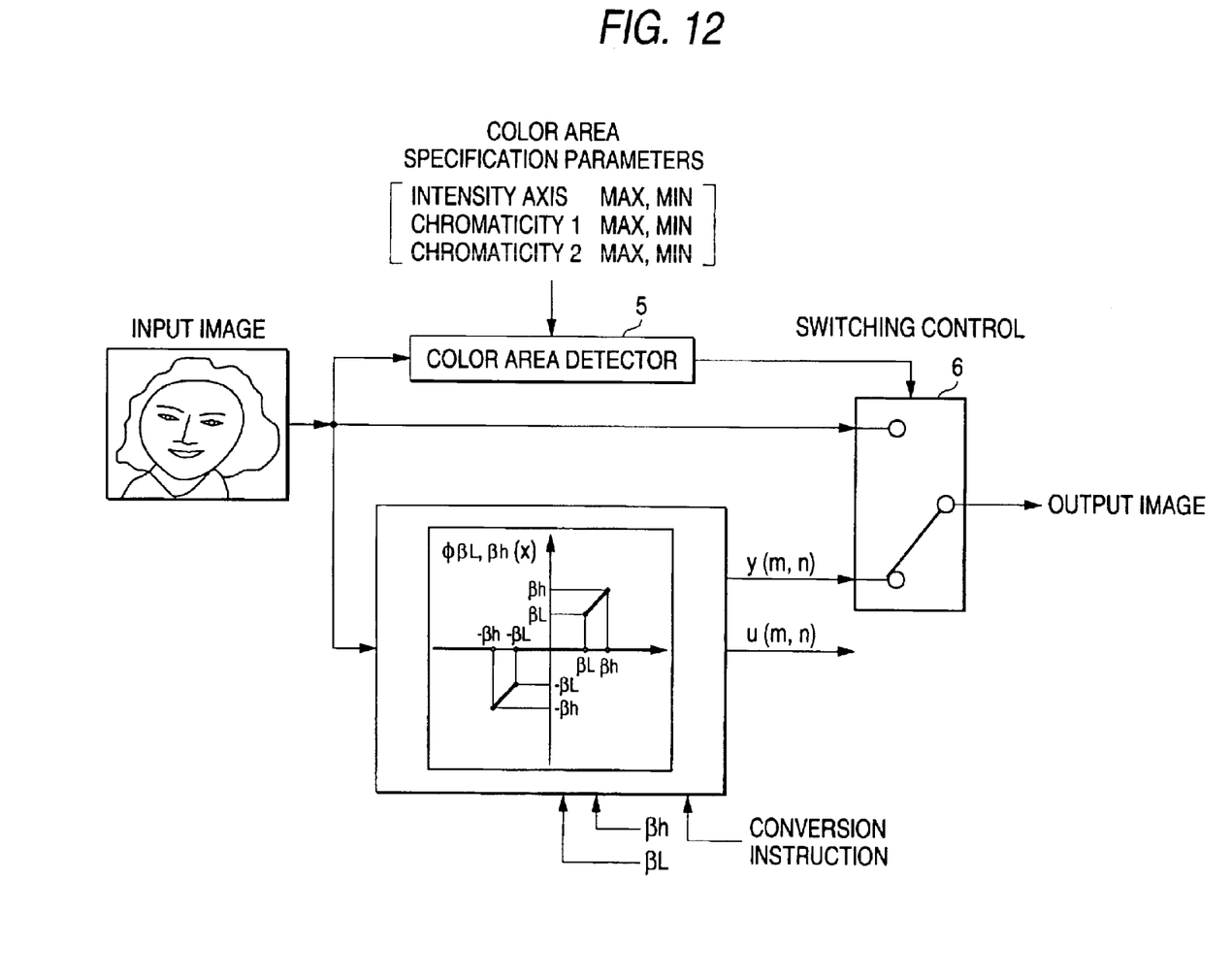
FIG. 12 shows a configuration example of an "electronic makeup" apparatus, which is configured by combining a $\beta$-filter and a color area determination circuit.

FIG. 12 shows a configuration example of the "electronic makeup" apparatus having such a configuration.

In FIG. 12, a color area determination circuit 5 determines a specific color area specified in parameters in an input image signal. A changeover switch 6 is controlled, based on the output of the color area determination circuit 5, so as to extract the output y (m, n) of the β filter as the output signal only in the determined color area, and output the original image signal for other areas.

As described above, the invented image processing apparatus uses the small amplitude variation component separation function of the ε-filter and the specific amplitude band variation component separation function of the βε-filter provided by the invention to correct the input image signal sequence as a two-dimensional image. Thereby executing "wrinkle enhancement" and conversion to "smooth skin" and "wrinkle enhancement" with a more natural look. The concept of separating and weakening or enhancing the small amplitude variation component and the specific amplitude band variation component, which is the basic principle of the invention, can be applied to the processing of one-dimensional signals as so-called time-series signals, needless to say.

According to this invention, the effects of "rejuvenation" and "old age" with a natural look for video representation in television and movies, can be produced in a more natural form by image processing.

What is claimed is:

1. An extended ε-filter image processing apparatus, comprising:

an input section for receiving an input image;

a calculation section for calculating a small-amplitude variation component of the input image;

a signal processing section for adding the small-amplitude variation component calculated by the calculation section to the input image to provide a wrinkle enhanced image, and for subtracting the small-amplitude variation component from the input image to provide a smooth skin image; and an output section for outputting at least one of the wrinkle enhanced image and the smooth skin image according to an instruction from a correction instruction section.

2. The extended ε-filter image processing apparatus as claimed in claim 1, wherein the calculation section calculates the small-amplitude variation component of the input image according to the equation $$\sum_i \sum_j a_{i,j} \cdot F(x(m, n) - x(m + i, n + j)),$$

wherein $$y(m, n) = x(m, n) - \sum_i \sum_j a_{i,j} \cdot F(x(m, n) - x(m + i, n + j)),$$

y(m,n) is the output image;
x(m,n) is the input image;
$a_{i,j}$ is a weight coefficient; and
F (x) is a nonlinear function, in which F(x)=0 when $|x|>\epsilon_o$.

3. An image processing apparatus comprising primary and secondary ε-filter blocks and an addition section, the primary ε-filter block comprising:
an input section for receiving an input image;
a calculation section for calculating a small-amplitude variation component of the input image by a first ε value εh;

a subtracting section for subtracting the small-amplitude variation component from the input image to provide a smooth skin image; and an output section for outputting the smooth skin image;

the secondary $\epsilon$-filter block comprising:

an input section for receiving the input image;

a calculation section for calculating a minute-amplitude variation component of the input image by a second $\epsilon$ value $\epsilon L$ which is less than the first $\epsilon$ value $\epsilon h$; and an output section for outputting the minute-amplitude variation component; and the addition section adding the minute-amplitude variation component output from the secondary $\epsilon$-filter block to the smooth skin image output from the primary $\epsilon$-filter block to obtain a natural looking smooth skin image preserving a grain and texture of the skin.

4. An image processing apparatus comprising an extended $\epsilon$-filter block, an ordinary $\epsilon$-filter block and a minute amplitude component adjustment section, the extended $\epsilon$-filter block comprising:

an input section for receiving an input image;

a calculation section for calculating a small-amplitude variation component of the input image by a first $\epsilon$ value $\epsilon h$;

a signal processing section for adding the small-amplitude variation component output from the calculation section to the input signal to provide a wrinkle enhanced image, and for subtracting small-amplitude variation component from the input signal to provide a smooth skin image; and an output section for outputting the wrinkle enhanced or the smooth skin image according to an instruction from a correction instruction section;

the ordinary $\epsilon$-filter comprising:

an input section for receiving the input image;

a calculation section for calculating a minute-amplitude variation component of the input image by a second $\epsilon$ value $\epsilon L$ which is less than the first $\epsilon$ value $\epsilon h$; and an output section for outputting the minute-amplitude variation component; and the minute amplitude component adjustment section adding the minute-amplitude variation component output from the ordinary $\epsilon$-filter to the wrinkle enhanced or the smooth skin image output from the extended $\epsilon$-filter block or subtracting the minute-amplitude variation component output from the ordinary $\epsilon$-filter from the wrinkle enhanced or the smooth skin image output from the extended $\epsilon$-filter block, according to the correction instruction in order to obtain a natural looking smooth or wrinkle enhanced skin image with a grain and texture of a skin held in an original state.

5. An image processing apparatus receiving arbitrarily two amplitude values as parameters, comprising:

an input section for receiving an input signal;

a calculation section for calculating selectively a variation component having an amplitude between the two amplitude values given as $\beta h$ and $\beta 1$ from the input signal;

a signal processing section for adding the variation component to the input signal or subtracting the variation component from the input signal, according to an instruction from a correction instruction section in order to obtain a natural looking smooth or wrinkle enhanced skin image with a grain and texture of a skin held in an original state; and an output section for outputting at least one of the smooth skin and the wrinkle enhanced image according to the instruction.

* * * * *